United States Patent Office 2,830,783
Patented Apr. 15, 1958

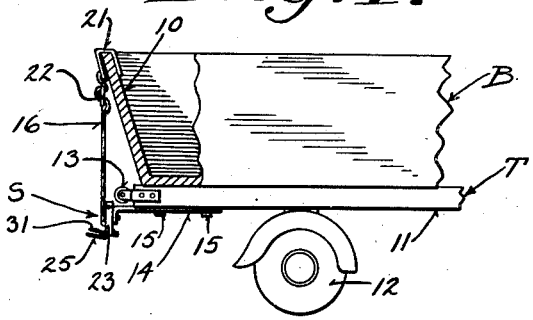

2,830,783
STRAP TIGHTENER
Ralph E. Halvarson, Milwaukee, Wis.
Application May 22, 1956, Serial No. 586,435
3 Claims. (Cl. 248—361)

This invention appertains to take-up devices, strap tighteners and the like, and more particularly to a novel device especially adapted for, but not necessarily limited to taking up slack in straps for firmly holding boats in place on carriers.

It has been the usual practice in the past, particularly in trailing boats, i. e. securing a boat to a trailer for movement from place to place, to first place the boat on the trailer frame and then to provide straps or webs having loops at their terminals usually extending over the boat with the loops received in some sort of fastening device secured to the trailer frame. The straps are usually tightened by buckles and due to the length of the straps and the position across the boat, much difficulty is experienced in pulling up on the straps and tightening them around the boat and then holding the straps in their tightened adjusted position while securing the loop ends to the trailer attaching means.

I know of a prior device for tightening straps and the like around boats, primarily designed for securing the boat to the top of an automobile and which device enables the strap to first be adjusted to a given position and then further tightened and secured by mere manipulation of a hand lever.

While such a device works exceptionally well, there is still need for an improved type of strap tightener, particularly when utilized for securing a boat to a trailer where, at times, both hands may be occupied. It is, therefore, highly desirable to provide some means to operate and tighten the strap or straps operable by the foot.

It is, then, a primary object of my present invention to provide a strap tightening device whereby, after a strap has been primarily adjusted, it may be firmly tightened and locked to the trailer frame by manipulating or moving a locking lever to the locking position with either the hand or the foot.

Another important object of my present invention is to provide a strap tightening device wherein one end of the strap may be hooked over the transom or upper edge of the boat after the boat is placed on the trailer and after an initial adjustment of the straps, and whereby a downward movement of the locking lever will tighten and firmly secure the strap to the trailer frame and to the boat.

A further object of my present invention is to provide novel means wherein the locking lever is securely held in its operative locked position against accidental displacement.

Still another object of my present invention is to provide a strap tightener with a main locking lever movable to its operative locked position in a downward direction and a latching lever adapted to firmly hold the locking lever in its locked position but which may, in turn, be quickly released by downward movement of the latching lever, both levers capable of manipulation by either the hand or the foot.

Still a further object of my present invention is to provide a simple, practical and reliable construction that is economical to manufacture, easy to assemble and positive in its operation.

With the above and other objects in view which will more readily appear as the nature of the invention is better understood, the same consists in the novel construction, combination and arrangement of parts hereinafter more fully described, illustrated and claimed.

A preferred and practical embodiment of my invention is shown in the accompanying drawing, in which drawing:

Figure 1 is a fragmentary side elevational view partly in section of a boat and trailer showing my novel strap tightener secured thereto in its operative locked position.

Figure 2 is an enlarged fragmentary side elevational view partly in section of my strap tightener showing the various parts in full lines in their locked position and in dotted lines, in their released or loosened position.

Figure 3 is a front elevational view of my novel strap tightener partly in section, the section being represented by the line 3—3 of Figure 2 of the drawing and looking in the direction of the arrows.

Figure 4 is a horizontal transverse sectional view through my novel strap tightener, the section being taken on the line 4—4 of Figure 2 of the drawing and looking in the direction of the arrows and, Figure 5 is a front elevational view of my novel strap tightener shown secured to the transom or rear of a boat but illustrating a slightly modified form, whereby my strap tightener may be used with a chain instead of a strap.

Referring now to the drawing in detail wherein similar reference characters designate corresponding parts throughout the several views, the letter S generally indicates one type of my improved strap tightener and the same is utilized to firmly secure a boat B to a trailer T. The boat may be of any standard construction and the numeral 10 merely represents the transom of the boat. The trailer T may likewise be of a standard construction and, therefore, will not be described in detail. However, it is noted that the trailer includes a body frame 11 carried by the usual trailer wheels 12 and may include roller means 13 to facilitate the movement of the boat onto the trailer frame.

In accordance with my present invention, I provide a bracket 14 which is firmly secured to the under portion trailer frame 11 by any desired means, such as the bolts 15 as shown. The bracket projects rearwardly beyond the frame and carries the strap tightener S and obviously, the same is utilized for tightening the strap 16. The lower end of the strap 16 is securely fastened at 17 to the face plate 18 of the strap tightener S and this face plate 18 may, in turn, be welded, bolted or otherwise secured to the bracket. But for the purpose of description, I have illustrated the face plate attached by means of a nut and bolt arrangement 19 to the projection 20 of the bracket 14.

The free end of the strap carries a hook or the like 21 preferably formed from a flat sheet of metal for engaging over the transom 10 of the boat B. The strap 16 is looped over the hook portion 21 and is initially adjusted as to proper length by means of the buckle 22 and while this buckle is not shown in detail, it merely comprises a flat piece of metal formed with two transversely extending spaced parallel slots into which the strap may be entwined.

Pivotally secured to the side walls 23 of the face plate 18 is the main tightening or locking lever 24, the lower end of which terminates in an outwardly extending handle or pedal portion 25 as better shown in Figures 2 and 4 of the drawings. The tightening lever 24 is of a substantially U-shape and adjacent to the lower end thereof and in close proximity to the pedal portion 25, are a pair of cross bars 26 and 27 respectively. The cross bar 26 functions as a guide for the strap 16 as will more readily appear as the description proceeds, and the bar 27 functions as a keeper for the locking and tightening lever 24.

As better shown in Figures 2 and 3 of the drawing, an intermediate portion of the strap 16 is trained about the bar 26 and this bar can be provided with an anti-friction roller 28 rotatably mounted thereon.

From the description thus far and noting in particular Figure 2 of the drawing, it can be seen that upon the raising of the tightening and locking lever 24 to its dotted line position, the strap 16 is loosened and this permits the removal of the hook end 21. When the lever is lowered and moved to its full line position, Figure 2 of the drawing, the strap 16 is tightened and when the hook 21 is engaged over the transom 10 of the boat B, the boat will be firmly held to the trailer frame 11. To retain the locking lever 24 in its lower strap tightening position, I provide a spring latch 29 which, in turn, is provided with a hook portion 30 and an outwardly extending manipulating handle or pedal portion 31. The hook portion 30 of the latch 29 hooks over the keeper bar 27 when the locking lever 24 is in its operative full line locked position and it is important to note that the outwardly extending pedal portion 31 constitutes a means for both retaining and releasing the locking lever and is manipulated by downward movement by either the hand or the foot.

In accordance with my present invention and to secure the boat to the trailer, it is merely necessary to place the hook end 21 over the transom 10 of the boat and adjust the strap 16 in the buckle 22 to a point where it is just loose enough to easily remove or manipulate the hook end.

Now, considering the locking lever 24 in its locked full line operative position of Figure 2 of the drawing, it is merely necessary to strike down on the latch lever 29 and move the same below the keeper bar 27 to its dotted line position and the stress on the strap will automatically pull upon the locking lever 24 and loosen the strap 16 whereby the locking lever and strap will move to the dotted line position of Figure 2 of the drawings. Obviously, when it is desired to tighten the strap 16, it is merely necessary to pull down or strike the pedal portion 25 of the locking lever 24 with either the hand or the foot to move the same from its dotted line position to its full line position (Figure 2) until the hook 30 of the latch 29 receives the keeper bar 27 and the locking lever will then be firmly held in its locked operative position.

As an added feature of my device, it should be noted that the legs 32 of the locking lever can either be sprung or removably slid into the pivot slots 33 in the side walls 23.

Attention is now directed to Figure 5 of the drawing wherein I have illustrated a slightly modified form of my device wherein the strap tightener S' may be readily adapted to be used with a chain 34 in lieu of the strap 16 (shown in Figures 1 to 4 of the drawings). In this form of the invention, the face plate 18, side walls 23 and the latching member 29 are all substantially the same except that in the tightening and locking lever 24', the cross bar 26 may be eliminated and a looped portion 35 utilized for receiving one link 36 of the chain 34. The upper hook end 21' is substantially the same except that I provide a vertical round end portion 37 which is formed with a series of slots 38 in which one end 39 of the chain 34 may be placed as desired.

Inasmuch as the chain does not have the flexibility or give of a strap, it is necessary to provide this adjustment in the hook end 21' and the chain is attached to the hook with the lever 24' in its open position so that there is considerable slack but so that when the locking lever 24' is moved to its locked position, the chain will be tight. Any number of these adjusting slots may be provided but in the preferred form, I utilize three which gives a described adjustment for most boats.

A salient feature of my invention resides in the fact that in both forms a downward movement of the pedal portions 25 and 31, respectively, is all that is needed to both lock and release my novel strap tightener S. Thus, it should be readily apparent that should both hands be occupied in steadying the boat or in placing the hook end over the transom, the locking lever may be moved to its locked position by utilizing the foot in a downward movement on the pedal 25.

From the foregoing, it is believed that the features and advantages of my invention will be readily apparent to those skilled in the art and it will, of course, be understood that changes in the form, proportion and minor details of construction may be resorted to without departing from the spirit of the invention or the scope of the appended claims.

I claim:

1. A device for releasably holding a boat to a trailer frame comprising a flexible strap, a member secured to one end of the strap for engaging a side of the boat, a face plate secured to the trailer frame, a latch member secured to said face plate adjacent the lower end thereof and extending outwardly therefrom, a locking and tightening lever rockably carried by the face plate and adapted to move in a downward direction to its operative locked position, a strap guide on said lever, and a keeper on said locking lever below said strap guide, the other end of said strap being secured to said face plate and extending around said strap guide, said latch member adapted to engage said keeper to releasably hold said locking lever in its locked operative position.

2. A device for releasably holding a boat to a trailer frame comprising a flexible strap, a member secured to one end of the strap for engaging a side of the boat, a face plate secured to the trailer frame, a spring latch member secured to said face plate adjacent the lower end thereof and extending outwardly therefrom, said latch member having a hook portion adjacent the outer end thereof, a locking and tightening lever rockably carried by the face plate and adapted to move in a downward direction to its operative locked position, an outwardly extending pedal on said locking lever, a strap guide associated with said locking lever intermediate its length, a keeper member adjacent and below said strap guide, the other end of said strap being secured to said face plate and extending around said strap guide, said hook portion of said spring latch adapted to engage said keeper member, and a second outwardly extending pedal on said spring latch, whereby both of said pedals are operative in a downward direction.

3. A device for releasably holding a boat to a trailer frame comprising a flexible strap, a member secured to one end of the strap for engaging the transom of the boat, a face plate secured to the trailer frame, a locking and tightening lever rockably carried by the face plate and adapted to move in a downward direction to its operative locked position, an outwardly extending pedal on said locking lever, said locking lever including, a strap guide extending transversely of said lever and a keeper member below said strap guide and parallel thereto, the other end of said strap extending around said strap guide and secured to said face plate at a point above said strap guide when said locking lever is in its operative locked position, a spring latching member having a hook portion engaging said keeper member for releasably holding said locking lever in its locked operative position, and a pedal on said spring latch extending outwardly and substantially parallel to said pedal on said locking lever, said pedal of said spring latch movable in a downward direction to release said locking lever, whereby pressure in a downward direction on said pedals will operate to lock and release said locking lever.

References Cited in the file of this patent

UNITED STATES PATENTS 2,240,192    Meyer  ---------------- Apr. 29, 1941
2,539,997    Graves  --------------- Jan. 30, 1951